United States Patent [19]

Han et al.

[11] Patent Number: 5,185,100

[45] Date of Patent: Feb. 9, 1993

[54] CONDUCTIVE POLYMERS FORMED FROM CONJUGATED BACKBONE POLYMERS DOPED WITH NON-OXIDIZING PROTONIC ACIDS

[75] Inventors: Chien-Chung Han, Madison; Ronald L. Elsenbaumer, Morris Township, Morris County, both of N.J.

[73] Assignee: Allied-Signal Inc, Morristown, N.J.

[21] Appl. No.: 501,066

[22] Filed: Mar. 29, 1990

[51] Int. Cl.$^5$ .............................................. H01B 1/20
[52] U.S. Cl. .................................. 252/500; 252/518; 528/422
[58] Field of Search ................ 252/500, 518; 528/422; 524/80, 401

[56] References Cited

U.S. PATENT DOCUMENTS

| | | |
|---|---|---|
| 3,686,141 | 9/1972 | Bracke . |
| 4,204,216 | 5/1978 | Heeger .................... 357/8 |
| 4,222,903 | 5/1978 | Heeger .................. 252/518 |
| 4,321,114 | 3/1980 | MacDiarmid .......... 204/2.1 |
| 4,442,187 | 12/1980 | MacDiarmid .......... 429/213 |
| 4,452,727 | 9/1982 | Frommer ............... 252/518 |
| 4,599,194 | 7/1986 | Frommer et al. ...... 252/518 |
| 4,599,194 | 6/1984 | Frommer ............... 252/518 |
| 4,626,588 | 12/1986 | Murase et al. ......... 528/481 |
| 4,791,177 | 12/1988 | Murase et al. ...... 525/328.5 |
| 4,808,681 | 2/1987 | Harper .................. 526/270 |
| 4,868,284 | 9/1989 | Murase et al. ......... 528/481 |
| 4,988,608 | 1/1991 | Tanaka et al. ......... 430/325 |
| 5,093,033 | 3/1992 | Feldhues et al. ...... 252/500 |
| 5,093,439 | 3/1992 | Epstein et al. ........ 525/540 |

FOREIGN PATENT DOCUMENTS

| | | |
|---|---|---|
| 0101808A2 | 7/1982 | European Pat. Off. . |
| 0167321A1 | 4/1984 | European Pat. Off. . |
| 0182548A3 | 7/1985 | European Pat. Off. . |
| 3224157 | 4/1986 | Fed. Rep. of Germany . |

OTHER PUBLICATIONS

Kossmehl, G. et al., Makromol Chem., v. 131, pp. 15-54 (1970).
Kossmehl G., Ber. Bunsenges Phys. Chem., 83, pp. 417-246 (1979)—Semicoductive Conjugated Polymers.
"Morphology of Conducting Organic Polymers: Polythiophene and Poly(3-Methyl Thiophene)", G. Tourillon et al., Jnl. Polymer Science, 22, (1984) 33-39.
"Stability of Conducting Polythiophene and Derivatives", G. Tourillon et al., Electrochemical Science and Technology, (1983), 2042, 2044.
"Uber Polyenarylene and Polyenheteroarylene", V. G. Kossmehl et al., Die Makromolekulare Chemie, 131, (1979) 15-36, 37-54.
"Highly-conducting, Poly(2,5-Thienylene Vinylene) preparsed via a Soluble Precursor", K-Y Jen et al., Jrl. The Chemical Society, (1987) 309-310.
"Semiconductive Conjugated Polymers", G. KoBmehl, Ber. Bunsengers, Phys. Chem. (1983) 417-426.
"Electrocheical Studies of Some Conducting Polythiophene Films", R. J. Waltman et al., J. Phys. Chem., 87, (1983) 1459-1463.
"Electron Spin Resonance Study of Electrochemically Generated Poly(thiophene) and Derivatives", G. Tourillon et al., Journal of Phys. Chem., 88 (1984), 1008-1051.
"Electrochemical Preparation of a Poly(3-methylthienylene) Film", S. Hotta et al., Short Communication, (1983), 317-318.
"Dopants, Doping Techniques" Man et al. Abstract presented at International Conference on Science and Technology of Synthetic Metals. Jun. 26-Jul. 2, 1988.

Primary Examiner—Mark L. Bell
Assistant Examiner—Alan Wright
Attorney, Agent, or Firm—R. C. Stewart, II; G. H. Fuchs; D. L. Webster

[57] ABSTRACT

This invention relates to electrically conductive polymers comprised of conjugated backbone polymers doped with one or more non-oxidizing protonic acids.

46 Claims, No Drawings

CONDUCTIVE POLYMERS FORMED FROM CONJUGATED BACKBONE POLYMERS DOPED WITH NON-OXIDIZING PROTONIC ACIDS

BACKGROUND OF THE INVENTION

1. Field of the Invention

This invention relates to electrically conductive polymers comprised of conjugated backbone polymers doped with one or more non-oxidizing protonic acids and to processes for forming said electrically conductive polymers. Another aspect of this invention relates to articles of manufacture fabricated totally or in part from such polymers and to blends comprised of one or more of said polymers and one or more other conductive and/or non-conductive polymers.

2. Prior Art

There has recently been an increased interest in the electrical conductivity of polymeric systems. For example, U.S. Pat. Nos. 4,321,114 and 4,442,187 are directed to conjugated polymers having conjugation in all or a part of at least one backbone chain thereof, such as polyacetylene, polyphenylene, and poly(phenylene sulfide). It has recently been discovered that these conjugated backbone polymers can be chemically doped in a controlled manner with electron acceptor and/or electron donor dopants to produce electrically conducting polymers. Doping procedures and certain representative doped polymers are described in U.S. Pat. Nos. 4,222,903 and 4,204,216.

In the general field of conducting polymers, it is believed very difficult to dope one of these conjugated backbone polymers to the extent that it becomes a good conductor ($10^{-3}$-100 ohm$^{-1}$cm$^{-1}$) and thereafter dissolve the polymer in any solvent-system. U.S. Pat. Nos. 4,452,727 and 4,599,194 disclose novel polymer solutions containing a doped sulfur-containing or oxygen-containing aromatic polymer. The solvent of this solution is restricted to solvents containing Lewis Acid halides having a liquid phase under atmospheric pressure for at least one temperature between $-150°$ C. and $+100°$ C., such as arsenic trifluoride, phosphorus trifluoride, phosphorous pentafluoride, phosphorus trichloride, boron trifluoride and the like. These solutions can be used to form articles, as for example, by casting the solution onto a substrate, and removing the solvent. This solution and method represents a significant advancement over the art; however, it does suffer from certain economic and practical disadvantages resulting from the cost and high environmental reactivity and toxicity of the specific solvents which must be used.

A few conductive species of polyalkylthiophenes are known, having been primarily prepared by electrochemical polymerization. Illustrative of such species are poly(3-methylthiophene) and poly(3,4-dimethylthiophene) R. J. Waltman et al., *J. Phys. Chem.*, 87, pp. 1459-1463 (1983). G. Tourillon et al., *J. Phys. Chem.*, 88, pp. 1049-1051 (1984). S. Hotta et al., *Syn. Metals.* 6, pp. 317-318 (1983). However, the polymers prepared electrochemically are not soluble in common organic solvents such as acetonitrile, propylene carbonate, tetrahydrofuran, dichloromethane, dimethyl formamide, nitrobenzene, nitropropane, toluene, and the like. In the absence of solutions, or plasticized forms the ability to economically fabricate articles out of the conducting forms of these poly(alkylthiophenes), especially semiconducting and conducting polymer films, fibers, and coatings, especially using conventional solvents or melt-forming techniques, s greatly restricted. In fact, the electrochemical methods are reported to give homogeneous conductive polymer films only up to film thickness of about 2000 Å. Powdery deposits are obtained when attempts are made to grow films thicker than this. G. Tourillon et al., *J. Poly. Sci. Poly. Phys. Ed.*, 22, pp. 33-39 (1984).

The unsubstituted polythiophenes form highly conductive complexes on doping which are not stable in normal environments (containing air or water vapor). However, electrochemically prepared conductive poly(3-methylthiophene) is environmentally stable. (G. Tourillon et al., *J. Electrochem. Soc., Electrochem Sci. Techn.*. 130, pp. 2042-2043 (1983)).

A few conductive oligomeric species of poly(thiophene vinylenes), i.e., 6 to 8 repeat units, are known. For example, such materials are described in G. Kossmehl et al., *Makromol chem.*, 131, pp. 15-54 (1970) and G. Kossmehl, *Ber. Bunsenges Phys. Chem.*. 83, pp. 417-426 (1979). These oligomeric species of poly(thiophene vinylenes) exhibit several undesirable properties, which limit their utility in potential applications such as EMI shielding, and as anti-static materials. For example, the above-cited publications disclose that these oligomeric poly(thiophene vinylenes) are insoluble in common organic solvents which essentially precludes solution processability, are infuseable which essentially precludes melt processability, and exhibit low conductivities ($10^{-12}$-$10^{-2}$ ohm$^{-1}$cm$^{-1}$) which essentially preclused use of such materials in EMI shielding and circuitry applications.

SUMMARY OF THE INVENTION

One aspect of this invention relates to an electrically conductive polymer comprising a conjugated backbone polymer doped with one or more non-oxidizing protonic acids wherein said polymer has a conductivity of greater than about $10^{-3}$ohm$^{-1}$cm$^{-1}$ as determined by the four-in-line probe method ("Laboratory Notes on Electrical and Galvanometric Measurements" by H. H. Weider, Elsevier Sci. Publishing Co. New York, 1979) and wherein at least one of said protonic acids has a non-aqueous or aqueous pKa equal to or less than about 4 and said conjugated backbone polymer has an oxidation potential less than or equal to about 4 volts vs Li/Li$^+$ in a suitable electrolyte medium. This invention provides several advantages over the prior art dopants. For example, the non-oxidizing protonic acid dopants do not produce any direct by-products from the doping process. In contrast, redox dopants such as FeCl$_3$, NOBF$_4$, AsF$_5$, SbF$_5$, MoCl$_5$ and the like produce a neutral by-product from the doping process (i.e. FeCl$_2$, NO, AsF$_3$, SbF$_3$, MoOCl and the like) which may cause such adverse effects as contamination of the desired conductive product, corrosion of nearby components, adverse toxicity and environmental problems. Moreover, non-oxidizing protonic acid dopants may impart other desirable properties to the doped polymer. For example, organic acids having long chain aliphatic groups such as long chain alkyl or perfluoroalkyl carboxylic acid or sulfonic acid dopants may function as plasticizers and can modify the cohesive energy density of the doped polymer. For example, poly(2,5-dimethoxy-phenylene vinylene) films doped with perfluorooctanoic acid are relatively flexible and rubbery while FeCl$_3$-doped poly(2,5-dimethoxyphenylene vinylene) films are much stiffer. Thus, through proper choice of acid dopant, the thermal stability, solution and melt processibility and environmental stability of conductive polymers can be improved or modified as desired. Another advantage that non-oxidative protonic acid doping offers over conventional redox doping is the absence of or substantial reduction of embrittlement and polymer degradation which typically occurs on "overdoping" with powerful redox dopants. "Overdoping" characterized by surpassing the doping level of a given maximum conductivity is still a possibility, but significant polymer degradation does not occur.

This invention also relates to solutions of the electrically conductive polymers of this invention in protic or aprotic solvents. These solutions can be used to form articles by removal of the solvent in the method of this invnention. Through use of this method and solution conductive articles and composites of all shapes as for example films and fibers can be conventiently made.

Another aspect of this invention relates to blends of the polymers of this invention and conventional thermoplastic and/or thermosetting resins e.g. polyolefins, polyesters, polyalkylene oxides, polyamides, epoxies, phenolics and the like and the use of such blends to form conductive articles.

DESCRIPTION OF THE PREFERRED EMBODIMENTS

This invention relates to a conductive polymer having a conductivity equal to or greater than about $10^{-3}$ $ohm^{-1}cm^{-1}$ which comprises a conjugated backbone polymer other than a polyaniline doped with a non-oxidizing protonic acid other than hydrofluoric acid. As used herein, a "conjugated backbone polymer" is a polymer other than polyaniline which is comprised of alternating carbon-carbon double bonds (either singularly or as part of an aromatic ring structure), which may optionally incorporate heteroatoms such as oxygen, nitrogen, sulfur, selenium, phosphorous and the like along the polymer backbone. Illustrative of such polymers are poly(unsaturated) polymers such as substituted and unsubstituted polyacetylene; poly(heteroaromatics), such as polythiophenes, polypyrroles, polyquinolines, polyisothianaphthenes, polycarbazoles, poly(carbazole vinylene), poly(alkyl thiophenes) and the like; poly(aromatics) such as polyphenylene, polynaphthalene, polyperinaphthalene, poly(azulene); and poly(aromatic vinylenes) such as poly(phenylene vinylene), poly(dimethoxy phenylene vinylene), poly(naphthalene vinylene) and the like; and poly(heteroaromatic vinylenes) such as poly(thienylene vinylene), poly(furylene vinylene), poly(pyrrole vinylene) and the like.

Preferred electrically conductive polymers are those with oxidation potentials less than 4.0 volts vs $Li/Li^+$. Illustrative of such preferred polymers are those comprising moieties of the formulas I to XIV:

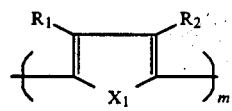
(I)

or

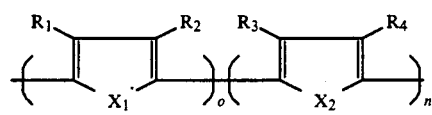
(II)

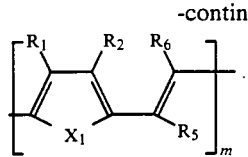
(III)

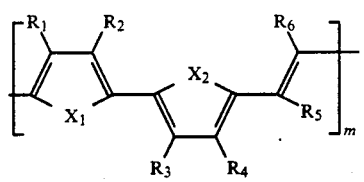
(IV)

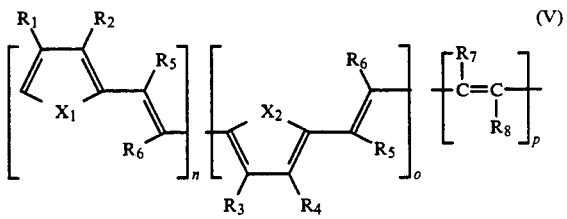
(V)

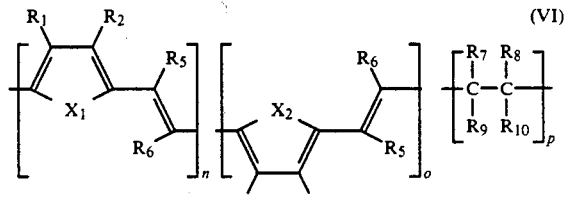
(VI)

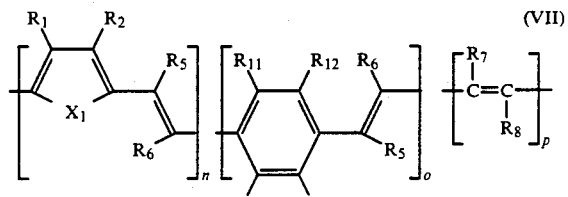
(VII)

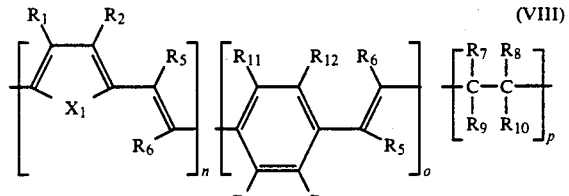
(VIII)

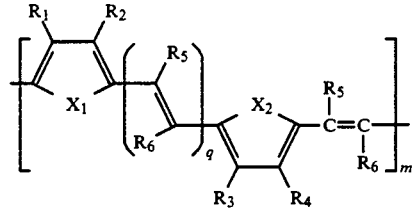
(IX)

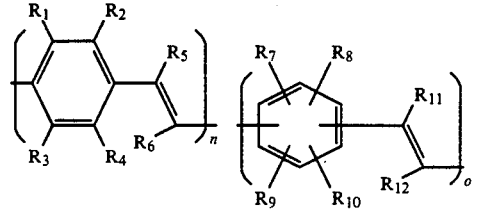
(X)

-continued

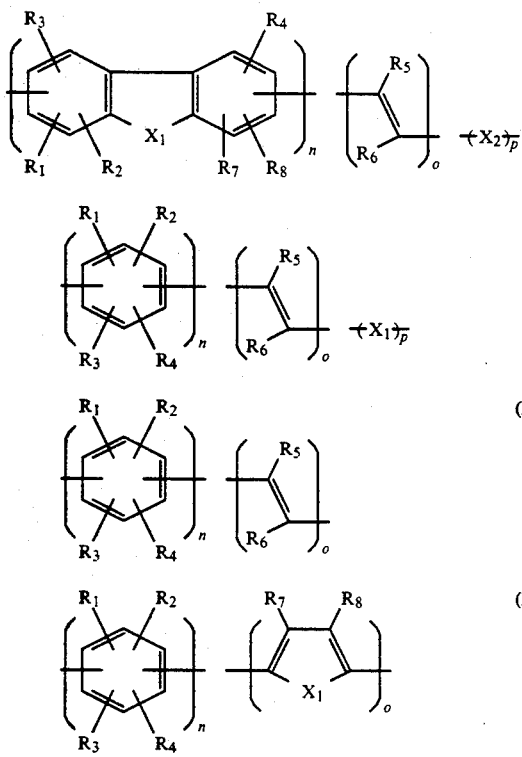

wherein:

m, and the sum of n, o and p are the same or different and are integers at least about 20, with the proviso that at least one of n or o is greater than zero;

q is an integer which can range from 0 to about 4;

$R_1$, $R_2$, $R_3$, $R_4$, $R_5$, $R_6$, $R_7$, $R_8$, $R_9$, $R_{10}$, $R_{11}$, $R_{12}$, $R_{13}$ and $R_{14}$ are the same or different at each occurrence and are hydrogen or isotopes thereof, hydroxyl, alkyl, alkenyl, aryl, alkoxy, cycloalkyl, cycloalkenyl, alkanoyl, alkylthio, aryloxy, alkylthioalkyl, alkynyl, alkylaryl, arylalkyl, amido, alkylsulfinyl, alkoxyalkyl, alkylsulfonyl, aryl, arylamino, diarylamino, alkylamino, dialkylamino, phosphoric acid, alkylarylamino, arylthio, heteroaryl, arylsulfinyl, alkoxycarbonyl, arylsulfonyl, carboxylic acid, halogen, nitro, cyano, sulfonic acid, or alkyl or phenyl substituted with one or more of sulfonic acid (or derivatives thereof), phosphoric acid (or derivatives thereof), carboxylic acid (or derivatives thereof), halo, amino, nitro, hydroxyl, cyano or epoxy moieties, or derivatives of a moiety of the formula:

—$(OR_{15})_rOR_{16}$ wherein:

$R_{15}$ is a divalent alkylene moiety having from 1 to about 7 carbon atoms;

$R_{16}$ is alkyl having from 1 to about 20 carbon atoms; and r is a natural number from 1 to about 50; or $R_1$ and $R_2$, or $R_3$ and $R_4$, or $R_5$ and $R_6$, or $R_7$ and $R_8$, or $R_9$ and $R_{10}$, or $R_{11}$ and $R_{12}$, or $R_{13}$ and $R_{14}$ substituents taken together may form an alkylene, alkenylene, or alkynylene group completing a 3, 4, 5, 6, 7, 8, 9 or 10 membered aromatic or alicyclic carbon ring, which ring may optionally include one or more degrees of unsaturation or one or more heteroatoms of nitrogen, sulfur, phosphorus, selenium, sulfinyl, sulfonyl or oxygen; and $X_1$ and $X_2$ are the same or different and are S, O, Se, —$NR_{17}$, or —$PR_{17}$—, wherein $R_{17}$ is hydrogen, alkylaryl, arylalkyl, alkyl or aryl.

Illustrative of useful $R_1$, $R_2$, $R_3$, $R_4$, $R_5$, $R_6$, $R_7$, $R_8$, $R_9$, $R_{10}$, $R_{11}$, $R_{12}$, $R_{13}$ and $R_{14}$ groups are hydrogen; hydroxyl; cyano; nitro; halo; alkyl such as methyl, ethyl, butyl, pentyl, octyl, nonyl, tert-butyl, neopentyl, isopropyl, sec-butyl, dodecyl and the like, alkenyl such as 1-propenyl, 4-butenyl, 1-pentenyl, 6-hexenyl, 1-heptenyl, 8-octenyl and the like; alkoxy such as propoxy, butoxy, methoxy, isopropoxy, pentoxy, nonyloxy, ethoxy, octyloxy, and the like; alkanoyl such as butanoyl, pentanoyl, octanoyl, ethanoyl, propanoyl and the like; arylamino and diarylamino such as phenylamino, diphenylamino and the like; alkylsulfinyl, alkylsulfonyl, alkylthio, arylsulfonyl, arylthio, and the like, such as butylthio, neopentylthio, methylsulfinyl, benzylsulfinyl, phenylsulfinyl, propylthio, octylthio, nonylsulfonyl, octylsulfonyl, methylthio, isopropylthio, phenylsulfonyl, methylsulfonyl, nonylthio, phenylthio, ethylthio, bezylthio, phenethylthio, sec-butylthio, naphthylthio and the like; alkoxycarbonyl such as methoxycarbonyl, ethoxycarbonyl, butoxycarbonyl and the like; alkyl amino and dialkylamino such as dimethylamino, methylamino, diethylamino, ethylamino, dibutylamino, butylamino and the like; cycloalkyl such as cyclohexyl, cyclopentyl, cyclooctyl, cycloheptanyl and the like; alkoxyalkyl such as methoxymethylene, ethoxymethylene, butoxymethylene, propoxyethylene, pentoxybutylene and the like; arylalkylamino such as methylphenylamino, ethylphenylamino and the like; aryloxyalkyl and aryloxyaryl such as phenoxyphenylene, phenoxymethylene and the like; and various substituted alkyl and aryl groups such as 1-hydroxybutyl, 1-aminobutyl, 1-hydroxylpropyl, 1-hydroxypentyl 1-hydroxyoctyl, 1-hydroxyethyl, 2-nitroethyl, trifluoromethyl, 3,4-epoxy-butyl, cyanomethyl, 3-chloropropyl, 4-nitrophenyl, 3-cyanophenyl, 1-hydroxymethyl, and the like; hydroxyl terminated alkyl and aryl groups such as, 2-hydroxy ethyl, 4-hydroxy butyl and 4-hydroxy phenyl; sulfonic acid, carboxylic acid and phosphoric acid terminated alkyl and aryl groups such as ethylsulfonic acid, propylsulfonic acid, butylsulfonic acid, phenylsulfonic acid, and the corresponding carboxylic and phosphoric acids and derivatives of said sulfonic, carboxylic and phosphoric acids as for example salts, esters and the like. Exemplary of other useful $R_1$ to $R_{14}$ groups are moieties of the formula:

—$(OR_{15})_rOR_{16}$ where r, $R_{15}$ and $R_{16}$ are as described above. Useful $R_{15}$ groups include divalent moieties of the formulas —$(CH_2)_2$—, —$(CH_2)_3$—, —$(CH_2)_4$— and —$(CH_2CH(CH_3))$—, and useful $R_{16}$, groups include —$CH_3$, —$CH_2CH_3$ and —$(CH_2)_8CH_3$. Illustrative of substituents having such $R_{15}$ and $R_{16}$ are ethyleneglycol monomethylether, diethylene glycol monomethylether, triethylene glycol monomethylether, tetraethylene glycol monomethylether, and the like.

Illustrative of $R_{17}$ groups are hydrogen, methyl, ethyl, propyl, hexyl, octyl, nonyl, phenyl, benzyl, vinyl, allyl, dodecylphenyl, phenethyl, phenylpropyl, 2,4-dimethylphenyl, 4-methylphenyl and the like.

Polymers for use in the practice of this invention may vary widely, the only requirement is that they are comprised of conjugated backbone polymers. Polymers with oxidation potentials less than about 3.5V vs Li/Li+ are more preferred for use in the practice of this invention. Of these more preferred polymers, preferred for use in the practice of this invention are homopolymers, and random or block copolymers of the above Formulas I to XIV in which:

m, and the sum of n, o and p are natural numbers at least about 40, preferably at least about 50, with the proviso that at least one of n or o is not zero;

q is an integer from 0 to about 4;

$R_1$, $R_2$, $R_3$ and $R_4$ are the same or different at each occurrence and are hydrogen or hydroxyl or alkyl having from 1 to about 20 carbon atoms, such as methyl, ethyl, propyl, isopropyl, n-butyl, sec-butyl, isobutyl, n-pentyl, isopentyl, sec-pentyl, tert-pentyl, n-hexyl, n-octyl, n-nonyl, n-decyl, and n-dodecyl; phenyl; alkylphenyl such as 2,4-dimethylphenyl, 4-methylphenyl, 4-ethylphenyl, and 4-butylphenyl; phenylalkyl such as benzyl, phenethyl; alkxoy having from 1 to about 12 carbon atoms such as methoxy, ethoxy, and propoxy; alkanoyl having from 1 to 20 carbon atoms such as formyl, acetyl, and propionyl; alkylthio having from 1 to 20 carbon atoms such as methylthio, ethylthio, propylthio, dodecylthio and butylthio; alkoxyalkyl having from 1 to 20 carbon atoms such methoxymethyl, ethoxyethyl and heptoxypropyl; alkenyl having from 1 to about 20 carbon atoms such as allyl, vinyl and 3-butenyl; or phenyl and alkyl substituted with phosphoric acid and derivatives thereof, cyano, nitro, epoxy, hydroxyl, carboxylic acid and derivatives, sulfonic acid and derivatives, or halo substituents such as trifluoromethyl, 3,4-epoxybutyl, cyanomethyl, 2-nitroethyl, 3-chloropropyl, 4-nitrophenyl, hydroxyethyl, —$CH_2CH_2CH_2SO_3H$; —$CH_2CH_2CH_2P(O)(OH)_2$; and —$CH_2CH_2CH_2CO_2H$: or moiety of the formula:

—$(OR_{15})_rOR_{16}$ wherein:

$R_{15}$ is alkyl having from 1 to about 4 carbon atoms;

$R_{16}$ is alkyl having from 1 to about 10 carbon atoms; and r is a natural number from 1 to about 25 such as ethylene glycol monomethylether and the like; or any of $R_1$ and $R_2$, or $R_3$ and $R_4$, substituents taken together may form an alkylene, alkenylene or alkynylene chain having from 2 to 20 carbon atoms completing a 4, 5, 6, 7, 8, 9 or 10 membered ring system(s) which may include one or more degrees of unsaturation or one or more heteroatoms of oxygen, nitrogen or sulfur such as 1,4-butandiyl, 1,2-ethanediyl, —$CH_2SCH_2$—, —$CH_2OCH_2$—, —$CH_2CH_2$—NH—$CH_2$—, or —$CH_2CH_2$—NH—;

$R_5$ to $R_{14}$ are the same or different at each occurrence and are hydrogen, hydroxyl, alkyl having from 1 to about 12 carbon atoms, phenyl, alkylthio having from 1 to about 12 carbon atom or alkoxy having from 1 to about 12 carbon atoms; alkoxyalkyl having from 2 to about 12 carbon atoms; alkylamino having about 1 to about 12 carbon atoms alkyl; or phenyl substituted with hydroxyl, phosphoric acid (and derivatives), cyano, nitro, epoxy, carboxylic acid (and derivatives), sulfonic acid (and derivatives) or halo substituents or any of $R_5$ and $R_6$, or $R_7$ and $R_8$, or $R_9$ and $R_{10}$, or $R_{11}$ and $R_{12}$ or $R_{13}$ and $R_{14}$ substituents together may form an alkenylene, alkynylene or alkylene chain having 2 to about 20 carbon atoms completing a 4, 5, 6, 7, 8, 9 or 10 membered ring system(s) which may include one or more degrees of unsaturation or one or more heteroatoms of oxygen, sulfur, or nitrogen such as 1,4-butandiyl, 1,2-ethanediyl, —$CH_2SCH_2$— or —$CH_2OCH_2$—; and $X_1$ and $X_2$ are the same or different and are oxygen, sulfur or —$NR_{17}$ wherein $R_{17}$ is hydrogen or alkyl or aryl.

Particularly preferred for use in the practice of this invention are homopolymers and random copolymers of the above-referenced Formula I to XIV wherein:

q is an integer from 0 to about 3;

m, and the sum of n, o and p are at least about 100 with the proviso that at least one of n or o is not zero;

$R_1$, $R_2$, $R_3$ and $R_4$ are the same or different at each occurrence and are hydrogen; hydroxyl; alkyl having from 1 to about 12 carbon atoms such as ethyl, methyl, propyl, n-butyl, sec-butyl, n-hexyl, n-octyl, and n-dodecyl; phenyl; alkoxy or alkylthio having from 1 to about 12 carbon atoms such as methylthio, ethylthio, propylthio, butylthio, methoxy, ethoxy and butoxy; alkoxyalkyl having from 1 to about 12 carbon atoms; or a moiety of the formula:

—$(OR_{15})_rOR_{16}$ wherein:

$R_{15}$ is alkylene of about 2 to 3 carbon atoms;

$R_{16}$ is alkyl of from 1 to about 10 carbon atoms; and r is a natural number from 1 to about 10;

$R_5$, $R_6$, $R_7$, $R_8$, $R_9$, $R_{10}$, $R_{11}$, $R_{12}$, $R_{13}$ and $R_{14}$ are the same or different at each occurrence and are hydrogen; hydroxyl; alkyl, such as methyl, ethyl or the like; substituted alkyl such as butylsulfonic acid, propylsulfonic acid, cyanomethyl, epoxybutyl, pentafluoroethyl, nitropropyl, and butylcarboxylic acid; alkoxy such as methoxy, ethoxy, butoxy, and the like; and alkylthio such as methylthio, ethylthio and the like; or any of $R_5$ and $R_6$, $R_7$ and $R_8$, $R_9$ and $R_{10}$, or $R_{11}$ and $R_{12}$, or $R_{13}$ and $R_{14}$ together may be an alkenylene or alkylene chain forming an alicyclic, aromatic or heteroaromatic ring;

$X_1$ and $X_2$ are the same or different and are oxygen, sulfur or —$NR_{17}$ where $R_{17}$ is hydrogen or alkyl having from 1 to about 10 carbon atoms.

Amongst these particularly preferred embodiments, most preferred are copolymers and homopolymers of Formula I to XIV in which:

q is an integer from 0 to about 2;

m, or the sum of n, o and p is at least about 125 with the proviso that at least one of n or o is not zero;

$R_1$ to $R_4$ are the same or different at each occurrence and are hydrogen, or alkyl, alkoxy or alkoxyalkyl having 1 to about 12 carbon atoms or a moiety of the formula:

—$(OR_{15})_rOR_{16}$ wherein:

$R_{15}$ is —$(CH_2)_2$— or —$(CH_2CH(CH_3))$—;

$R_{16}$ is —$CH_3$ or —CH and r is a natural number 1 to about 6;

$R_5$, $R_6$, $R_7$, $R_8$, $R_9$, $R_{10}$, $R_{11}$, $R_{12}$, $R_{13}$ and $R_{14}$ are the same or different at each occurrence and are hydrogen, hydroxyl, alkyl, or any of $R_5$ and $R_6$, $R_7$ and $R_8$, $R_9$ and $R_{10}$, or $R_{11}$ and $R_{12}$, or $R_{13}$ and $R_{14}$ together may form a divalent alkylene or alkenylene chain forming an alicyclic, aromatic and/or heteroaromatic ring; and $X_1$ and $X_2$ are sulfur or —$NR_{17}$ where $R_{17}$ is hydrogen or alkyl having from 1 to about 7 carbon atoms.

The polymer is doped with a suitable non-oxidizing protonic acid dopant to render it electrically conductive. The type of dopant is critical. The dopant acid must be a non-oxidizing protonic acid other than HF and it must possess a certain pKa in the doping medium. Surprisingly, we have discovered that non-oxidizing protonic acids are useful dopants of conjugated backbone polymers other than polyaniline to achieve a conductivity greater than about $10^{-3}$ S/cm$^{-1}$ where the pKa of the acid in the doping medium or in water is equal to or less than about 4. In general, the higher the ionization potential of the conjugated backbone polymer, the lower the acid pKa required to provide a conductive polymer having the minimum level of conductivity i.e. conductivity greater than about $10^{-3}$ Scm$^{-1}$; and conversely, the lower the ionization potential of the conjugated backbone polymer the required minimum level of conductivity can be obtained using acids having higher pKa's. In the preferred embodiments of the invention, the acid and the conjugated backbone polymer are selected such that the doped polymer has a conductivity by the four-in-line probe method of equal to a greater than about $10^{-2}$ Scm$^{-1}$, in the more preferred embodiments of the invention, the acid and the conjugated backbone polymer are selected such that the doped polymer has a conductivity equal to or greater than about $10^{-1}$ Scm$^{-1}$; and in the most preferred embodiments of the invention, the acid and conjugated backbone polymer are selected such that the conductivity of the doped polymer is equal to or greater than about $10^0$ Scm$^{-1}$.

Acids for use in the practice of this invention are "non-oxidizing protonic acids". As used herein, a "non-oxidizing protonic acid" is an organic or inorganic compound capable of donating a proton, and does not undergo a reduction reaction between about 2 to about 4 volts vs Li/Li$^+$ with other than the liberation of hydrogen gas. Thus, non-oxidizing protonic acids useful in this invention are those that donate a proton to the conjugated polymer giving rise to the expected conjugated base anion which undergoes no change in oxidation state. Illustrative of such acids are organic and inorganic acids such as hydrogen chloride, hydrogen iodide, hydrogen bromide, phosphoric acid, sulfamic acid, alkylsulfonic acids, such as methane sulfonic acid, ethane sulfonic acid, dodecylsulfonic acid, and the like, arylsulfonic acids such as benzenesulfonic acid, p-toluene sulfonic acid, dodecylbenzene sulfonic acid, naphthalene disulfonic acid, naphthalene sulfonic acid and the like, polymeric acids such as poly(vinyl sulfonic acid), poly(styrene sulfonic acid), poly(acrylic acid), and the like, halogen containing alkylsulfonic acids such as trifluoromethane sulfonic acid, pentafluoropropionic acid, perfluorooctyl sulfonic acid and the like, aromatic and aliphatic carboxylic acids such as benzoic acid, formic acid, acetic acid, propionic acid, butyric acid, and the like, halogen containing carboxylic acids such as chloroacetic acid, dichloroacetic acid, trichloroacetic acid, trifluoroacetic acid, perfluorobutyric acid, perfluorooctanoic acid, inorganic acids such as tetrafluoroboric acid, hexafluorophosphoric acid, hexafluoroarsenic acid, and the like, nitroacetic acid, hydroxyacetic acid, diphenylacetic acid, malonic acid, cyanoacetic acid, maleic acid, and the like.

Preferred for use in the practice of this invention are organic acids. More preferred for use in the practice of this invention are aliphatic or aromatic sulfonic or carboxylic acids and aliphatic or aromatic sulfonic or carboxylic acids substituted with one or more halo substituents. In the most preferred embodiments of this invention, useful acids are selected from the group consisting essentially of alkyl sulfonic acids, such as methane sulfonic acid, ethane sulfonic acid, dodecyl sulfonic acid, aryl sulfonic acids such as benzene sulfonic acid, p-toluene sulfonic acid, dodecylbenzene sulfonic acid, naphthalene disulfonic acid, and the like, halogenated alkyl and aryl sulfonic acids such as trifluoromethane sulfonic acid, perfluorobenzene sulfonic acid, trifluoromethyl benzene sulfonic acid, and the like, carboxylic acids such as acetic acid, propionic acid, butyric acid, phenylacetic acid, hydroxyacetic acid, benzoic acid and the like, halogenated carboxylic acids such as chloroacetic acid, dichloroacetic acid, trichloroacetic acid, trifluoroacetic acid, perfluoropentanoic acid, pentafluoropropionic acid, perfluorooctanoic acid, perfluorobenzoic acid, and the like, and polymeric acids such as poly(vinyl sulfonic acid), poly(acrylic acid) and the like.

The electrically conductive polymers of this invention are formed by doping the corresponding neutral forms of the polymer in solution or in the solid state. In general, these doped conductive forms are prepared by treatment of the conjugated polymer with a suitable acid in a suitable form.

For example, one method of forming the electrically conductive polymer of this invention merely involves contacting the neutral polymer in solid form with a suitable acid in solution or in gaseous form for a time sufficient to obtain the desired degree of doping. For example, a conjugated backbone polymer such as poly(thienylene vinylene), or poly(dimethoxyphenylene vinylene) can conveniently doped by contacting same with a suitable acid such as hydrochloric acid or gaseous hydrogen chloride to obtain the appropriate level of doping. The conditions of such doping are not critical provided that sufficient acid is used to dope the desired quantity of polymer over the desired contacting period and further provided that the acid pKa is equal to or less than about 4.

It can be appreciated that with such a wide range of potential protonic acid doping agents, one can choose dopants that impart other desirable characteristics to the doped polymer beyond conductivity. Illustrative of such other useful properties are plasticization and water repellancy. For example, poly(dimethoxyphenylene vinylene) films doped with conventional redox dopants such as FeCl$_3$ can be rather stiff and brittle. However, films doped with perfluorooctanoic acid are very flexible and rubbery. Here, the perfluorooctanoic acid functions as both dopant and plasticizer for the doped film. Likewise, the choice of a perfluoroalkyl containing dopant species considerably changes the surface tension properties of the polymer so as to be much more water repellent.

In some instances where the conjugated backbone polymer is soluble in certain organic solvents such as certain poly(heteroaromatic), poly(heteroaromatic vinylenes), and poly(aromatic) and poly(aromatic vinylenes), the polymer can be doped in solution by a suitable acid, afterwhich the solution can be cast into a described shape. Thus, for example, by introducing poly(3-n-butylthienylene vinylene-co-3-ethylthienylene vinylene) as a solid powder, nitrobenzene as a liquid and methane sulfonic acid, into a mixing vessel, a solution of the doped polymer is quickly formed, from which conductive polymer can be cast. The conditions of such mixing are not critical, provided that sufficient methanesulfonic acid is used to dope the desired quantity of polymer and sufficient solvent is employed to reduce the viscosity of the solution to manageable levels. An alternate technique of preparing the doped polymer is to mix first the polymer and the solvent, which can form a homogeneous solution or remain as a two-phase system almost indefinitely depending on the solvent chosen, thereafter adding the acid to the solution or two phase system to form a solution of the doped polymer from which the conductive polymer can be cast. Thus, for example, if poly(3-butylthieneylene vinylene) powder is admixed with nitromethane solvent, the powder will remain on or suspended in the solvent for extended periods under normal conditions. The addition of a non-oxidizing protonic acid to this suspension, such as trifluoromethane sulfonic acid, causes the polymer to be doped and, almost instantaneously thereafter, causes the doped polymer to go into solution. The solidified forms of the electrically conductive polymer can be obtained on removal of the solvent from the solution. With regard to solutions of both the conductive doped polymer, it is contemplated to remove the solvent from the solution to allow the copolymer or homopolymer to solidify. Excess dopant, if present, may be removed from the solution by some suitable conventional method if desired. The solvent can be removed from the solution through use of any conventional solvent removal method but is removed preferably by evaporation. Alternatively, the solvent and excess dopant can be removed by extraction with an extractant in which the solvent and dopant are substantially more soluble than the doped polymer.

In those cases where a protonic acid can be used to form a conjugated polymer from a precursor non-conjugated polymer by an acid catalyzed elimination reaction, one can choose a protonic acid so that it can function as both elimination catalyst and dopant to form in one step the conjugated doped polymer. Illustrative of such a system is poly(2,5-dibutoxyphenylene-1,4-diyl-1'-butoxyethylene-1',2'-diyl), which can be converted to poly(2,5-dibutoxy phenylene vinylene). One may add various chemical agents to chemically remove the eliminated species as for example anhydrides such as trifluoromethane sulfonic anhydride, methane sulfonic anhydride, fluorosulfonic anhydride, chlorosulfonic anhydride, trifluoroacetic anhydride and acetic anhydride and halogenated silanes such as chlorotriethyl silane and dichlorodimethyl silane. The addition of a non-oxidizing protonic acid with a pKa of less than about two to a solution of this precursor polymer in chloroform in the presence of a butanol scavenging agent such as acetic anhydride causes the formation of the conjugated polymer poly(2,4-dibutoxy phenylene vinylene) which subsequently is doped by the protonic acid to give a solution of the doped conductive form of the poly(dibutoxy phenylene vinylene). The solidified forms of conductive poly(dibutoxy phenylene vinylene) can be obtained on removal of the solvent from the solution.

As will be appreciated by those skilled in polymer processing, the ability to form polymer articles by removing a solvent from a solution enables one to prepare articles of a wide variety of shapes and sizes. Thus, for example, by removing volatiles from the present solution spread on a surface, films of any desired thickness can he prepared. By extruding the solution through a die, fibers or films can be made. Similarly, by removing volatiles from the solution in a mold of various shapes, shaped articles conforming in shape to the mold can be prepared. It will be appreciated that some shrinkage might occur between the solution in its last flowable state to the final article. but such shrinkage is conventionally accounted for in molding polymers from solution. It is also contemplated that, once a solution is formed, a partial or substantial removal of solvent will occur prior to placing the solution on a surface or in a mold, with the final venting of solvent occurring on the surface or in the mold. It is contemplated that, if additional soluble components are introduced into the solution, they will, unless also volatile, be present in the shaped article formed. If the additional component(s) are non-volatile liquids, then the removal of volatile components may leave a new liquid or plasticized form of doped conducting polymer polymer. If the additional components are volatile, then foamed or expanded cellular forms of the polymer may be formed.

It can be appreciated that mixtures of protonic acid doped polymers and monomers capable of acid-catalyzed polymerization in a suitable solvent or in liquid monomer can give conducting polymer composites in non-conducting host polymers by in-situ polymerization of the monomer. Illustrative of useful monomers are those which polymerize by ring opening reactions. Such monomers include cyclic ethers, such as ethylene oxide, propylene oxide, 2,2-bis(chloromethyl trimethylene-3-oxide), epichlorohydrin, oxetanes, 3,3-bis(-chloromethyl)-oxetane. cyclic oligomers of poly(2,6-dimethyl-1,4-phenylene oxide), tetrahydrofuran, oxepane, or a mixture of tetrahydropyran and/or tetrahydrofuran and other cyclic ethers, and the like; cyclic ethers containing more than one oxygen, such as 1,3-dioxolanes, 1,3-dioxanes, 1,3-dioxepanes, 1,3-dioxocanes, 1,3-dioxonanes, 1,3-dioxacycloundecanes, 1,3-dioxacyclotridecanes, 1,3,5-trioxanes, 1,3,5-trioxepanes, 1,3,6-trioxocanes, 1,3,5,7-tetraoxanes, 1,3,6,9-tetraoxacycloundecanes, 1,3,6,11-tetraoxacyclotri-decanes, 1,3,6,9,12-penta-oxacyclotetradecanes, 1,3,6,9,12,15-hexaoxacycloheptadecanes, and the like; cyclic sulfides, such as thiacyclopropane, thiacyclobutane, and the like; lactams, such as 3-ethanolactam, 3-propanolactam, 4-butanolactam, 5-pentanolactam, 6-hexanolactam, 7-heptanolactam and the like; lactones, such as γ-propiolactone, γ-butyrolactone. γ-butyrolactone, γ-valerolactone, γ-caprolactone, and the like. Other lactones analogues, such as glycolides, lactides, ethylene carbonate, 1,3-dioxepane-7-ones, 1,5-dioxepane-7-ones, 1,4-dioxepane-7-ones, 1,4-dioxane-2-ones, ethylene oxalate, dioxane-2,6-diones, 1,4-thioxane-3-ones, thioxepane-2-ones, and the like; bicyclic acetals, such as 2,7-dioxabicyclo[2.2.1]heptane, 6,8-dioxabicyclo[3.2.1]octane, 2,7-dioxabicyclo-[4.1.0]heptane, 2,6-dioxabicyclo[4.1.0]heptane, 2,6-dioxabicyclo[3.1.1]heptane, 2,8-dioxabicyclo-[3.2.1]octane, and the like; cyclic siloxanes, such as hexamethylcyclotrisiloxane, octamethylcyclotetrasiloxane, hexaalkylcyclotrisiloxane, octaalkyltetrasiloxane, and the like; and cyclic amines such as aziridine, azetidine, conidine, 1-azabicyclo[2.2.2]-octane, 1,4-diazabicyclo-[2.2.2]octane, and the like. Illustrative of such a system is a solution of poly(3-methoxy thienylene vinylene) in tetrahydrofuran (THF) to which has been added pentafluoropropionic acid in a sufficient amount so as to dope the conjugated polymer and cause acid-catalyzed polymerization of THF. Upon removal of residual THF, from the composite solution, a conductive composite film comprised of protonic acid doped poly(3-methoxy thienylene vinylene) and poly(tetrahydrofuran) is obtained.

Other useful monomers are unsaturated monomers as for example ethylene, styrene, propylene, isobutylene, vinyl acetate, vinyl chloride, vinylidene chloride, tetrafluoroethylene, chlorotri-fluoroethylene and the like; dienes such as 1,3-butadienes, 2-methyl-1,3-butadienes, 2-tert-butyl-1,3-butadienes,, 2-chloro-1,3-butadienes and the like; and acetylenes and diacelylenes.

In those embodiments of the invention in which the solution contains a doped polymer, a conductive or semi-conductive article is formed upon removal of the solvent. However, in those embodiments of the invention in which the solution contains a neutral polymer, the resulting article must be contacted with a suitable dopant to render the article conductive or semi-conductive. For example, a solution of neutral poly(3-n-butyl-thienylene vinylene) can be prepared by dissolving the polymer in a solution such as tetrahydrofuran, toluene or nitrobenzene. Solvent can be removed from solution forming an article composed of the neutral polymer. Thereafter, the polymer article is exposed to a suitable non-oxidizing protonic acid dopant, as for example perfluoropentanoic acid or trifluoromethane sulfonic acid dissolved in a solvent, such as pentane or hexane in which the neutral and doped polymer are not soluble, for a time sufficient to dope the polymer article to the desired extent.

The upper conductivity of the polymer is not critical, and usually the highest conductivity which can be obtained is provided. In general, the polymer is doped until it has an electrical conductivity equal to or greater than $10^{-3} \text{ohm}^{-1}\text{cm}^{-1}$. In the preferred embodiments of the invention, doping is continued until the electrical conductivity of the polymer is equal to or greater than about $10^{-2} \text{ohm}^{-1}\text{cm}^{-1}$ and, in the particularly preferred embodiments doping is continued until the electrical conductivity is equal to or greater than about $10^{-1} \text{ohm}^{-1}\text{cm}^{-1}$ In the most preferred embodiments, doping is continued until conductivities equal to or greater than about $10^{0} \text{ohm}^{-1}\text{cm}^{-1}$ are obtained, with conductivities equal to or greater than about $10^{+1}$ being conductivities of choice.

The electrically conductive polymers of this invention may be used to form compositions containing one or more other optional materials. The nature of such optional ingredients can vary widely, and include those materials which are known to those of skill in the art for inclusion in polymer articles. In the case of dissolvable components, materials may be present which alter the physical or mechanical properties of either the solution or the articles eventually cast from the solution. Examples of such materials include other conventional thermoplastic and thermosetting polymers such as polyacrylontrile, polyvinylidiene chloride, polyethylene oxide, polystyrene, nylon, cellulose acetate butyrate, phenolics, alkyds, epoxies, silicones, polypropylene, polyethylene, cellulose acetate, polyphenylene oxide, polycarbonate, polyphenylene sulfide and the like. Still other useful optional ingredients are other electrically conductive polymers such as those of this invention and those in which the dopant is an oxidant.

The electrically conductive polymer of this invention and compositions formed therefrom can be used for any purpose for which conductive polymers are useful. For example, the composition can be used to form electrically conductive articles. Examples of articles include conductive polymer housings for EMI Shielding of sensitive electronic equipment such as microprocessors, infrared, radio frequency and microwave absorbing shields, flexible electrical conducting connectors, conductive bearings, brushes and semiconducting photoconductor junctions, electrodes, capacitors, optically transparent or non-transparent corrosion-preventing coatings for corrodible materials such as steel, antistatic materials and optically transparent or non-transparent coatings for packaging or protecting electronic components, carpet fibers, waxes for floors in computer rooms, antistatic finishes for cathode ray tube (CRT) screens, coatings for windows for automobile, aircraft, and buildings for solar energy control, electrostatic dissipative packaging and handling containers for electronics, and the like.

The following specific examples are presented to more particularly illustrate the invention, and should not be construed as being limitations on the scope and spirit of the invention.

EXAMPLE 1

A sample of cast film of poly(dimethoxyphenylene vinylene) 20 microns thick and a 2 cm long and 3 cm wide was submerged into a solution comprised of 20 ml of nitromethane and 8 ml of methane sulfonic acid (pKa<1) for 15 min at 20° C. The doped film was removed from the solution, washed with pure nitromethane and air dried. The dried film exhibited a room temperature D.C. conductivity of 36.8 S/cm as determined by a 4-in-line probe. Elemental analysis gave C: 62.63%, H: 5.97% and S: 7.26% from which a doping level of 46.1 mole % per phenylene vinylene repeat unit was calculated. The conductivity of this film remained constant for several months under ambient conditions.

EXAMPLE 2

A similar piece of poly(dimethoxyphenylene vinylene) film was treated as in Example 1 with a 10 wt% solution of benzene sulfonic acid in nitromethane at 20° C. for 2 hr. The doped film was washed with pure nitromethene and air dried. The film exhibited a room temperature D.C. conductivity (4-in-line probe) of 42 S/cm. Elemental analysis gave C: 58.66%, H: 5.46%, S: 6.0% from which a doping level of 54 mol % per phenylene vinylene repeat unit was calculated.

EXAMPLE 3

Repeating Example 1 using a 10 wt% solution of dichloroacetic acid in place of methane sulfonic acid in nitromethane and a contact time of 24 hr. gave a film after drying with a D.C. conductivity at room temperature of 12.1 S/cm. Elemental analysis gave C: 63.4%, H: 5.59%, Cl: 7.38% from which a doping level of 20.7% was calculated.

EXAMPLE 4

The procedure of Example 3 was repeated using trichloroacetic acid in place of dichloroacetic acid, and a contact time of 8 hr. at room temperature. The film exhibited a room temperature D.C. conductivity of 18.8 S/cm. Elemental analysis gave C: 65.99%, H: 5.50%, Cl: 7.59% from which a doping level of 13.1 mol % was calculated.

EXAMPLE 5

The procedure of Example 3 was repeated using perfluorooctanoic acid in place of trichloroacetic acid with a contact time of 26 hr. The resulting doped film after drying was very flexible and rubbery-like indicating that the dopant acts as a plasticizer for the film. Its room temperature D.C. conductivity was 71 S/cm (4-in-line probe).

EXAMPLE 6

A sample of poly(thienylene vinylene), cpd III $R_1=R_2=R_5=R_6=H$, 38 microns thick, 3 cm wide and 2 cm long was treated with a solution of methane sulfonic acid (8 ml) in nitromethane (20 ml) for 20 hr. at room temperature. The film was washed with pure nitromethane and air dried. It exhibited a D.C. room temperature conductivity of 2.4 S/cm. Elemental analysis indicated a doping level of 8.7 mol %.

EXAMPLE 7

A copolymer film comprised of 10% dimethoxyphenylene vinylene units and 90% phenylene vinylene units (cpd X, $R_2=R_4=$methoxy, $R_1=R_3=R_5=R_6=R_7=R_8=R_9=R_{10}=H$, ratio of o/n=9) was treated with a solution of 7.3 g of methane sulfonic acid in 30 ml of nitromethane for 2 hr. at 20° C. After the film was washed with pure nitromethane and air dried, it exhibited a room temperature D.C. conductivity of 44.1 S/cm, and a doping level of 19.7 mol %.

EXAMPLE 8

A film of a homopolymer of phenylene vinylene units (cpd X, $R_1=R_2=R_3=R_4=R_5=R_6=H$, o=0) when treated as in example 7 gave a conductivity of 10.7 S/cm and a doping level of 10.9 mol %.

EXAMPLE 9

Poly(2,5-dibutoxy phenylene-1,4-diyl-1'-butoxy ethylene vinylene) (25 mg) (cpd X, $R_2=R_5=$butoxy, $R_1=R_3=R_5=R_6=H$, o=0), dissolved in 5 ml of chloroform with a trace of acid present slowly changed a red solution of the highly conjugated dibutoxyphenylene vinylene polymer. This solution was diluted by a factor of 5 with more chloroform and then divided into 5 equal samples. To each separately were added different protonic acids to effect doping. These solutions stayed homogeneous for varying periods of time depending on the nature of the protonic acid dopant. The results were as follows:

| Dopant | Time to precipitation at room temperature |
|---|---|
| $CF_3CF_2CF_2COOH$ | 2 weeks |
| $CF_3CF_2COOH$ | >1 month |
| $C_6H_5SO_3H$ | >1 month |
| $CF_3SO_3H$ | 3-4 hours |

EXAMPLE 10

To a 6 ml tetrahydrofuran (THF) solution containing 20 mg of poly(3-methoxythienylene vinylene) was added 0.5 ml of methane sulfonic acid. The resulting mixture turned into a blue gel after staying at room temperature for a few hours. After removing the THF solvent residue, a blue composite film was obtained, which comprised of a mixture of doped poly(3-methoxy thienylene vinylene) and poly(tetrahydrofuran).

EXAMPLE 11

A protonic-acid-doped poly(dibutoxyphenylene vinylene) was prepared by first dissolving 50 mg of poly(-dibutoxyphenylene-1,4-diyl-1'-butoxyethylene-1',2'-diyl) in 10 ml of deuterated chloroform, then adding 0.5 ml of pentafluoropropionic acid. Into this green conductive solution, a bundle of 6-lobal polypropylene fiber was soaked for about 5 to 10 minutes and then dried in air overnight. The surface resistance of this conductive polymer coated fiber was measured to be $10^7$ to $10^8$ ohm/sq.

What is claimed is:

1. An electrically conductive polymer other than polyaniline comprised of a conjugated backbone polymer doped with one or more non-oxidizing protonic acids other than hydrofluoric acid wherein said electrically conductive polymer has a conductivity greater than about $10^{-3}$ S/cm and wherein at least one of said acids has an aqueous or non-aqueous pKa equal to or less than about 4 and the polymer has an oxidation potential less than about 4 volts vs Li/LI+ reference electrode, wherein said conjugated backbone polymer is a homopolymer or copolymer having at least one type of recurring unit of the following formulae I to XIV:

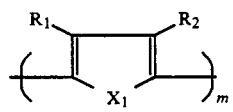

(I)

or

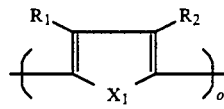

(II)

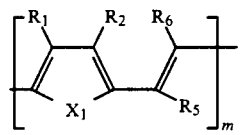

(III)

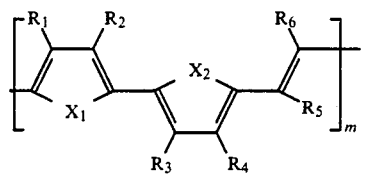

(IV)

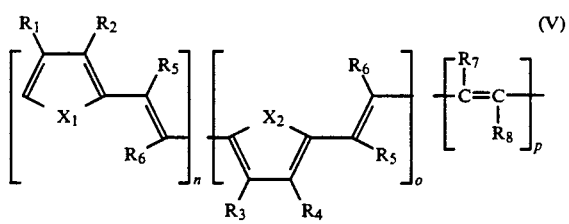

(V)

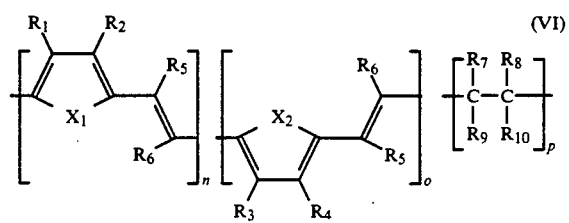

(VI)

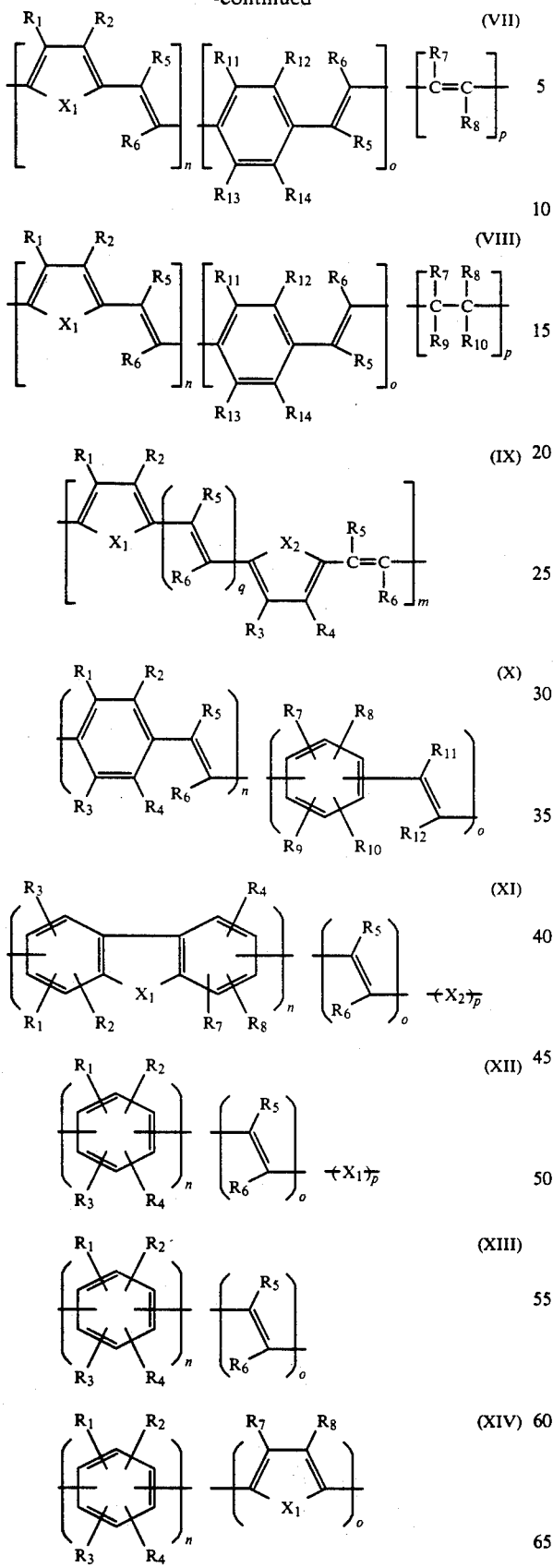

m is an integer equal to or greater than about 20;

n, o and p are the same or different at each occurrence and are 0 or an integer equal to or greater than 1, with the proviso that the sum of n, o and p is equal to or greater than about 20, and with the further proviso that at least one of n or o is greater than zero;

q is an integer from 0 to about 4;

$R_1$, $R_2$, $R_3$, $R_4$, $R_5$, $R_6$, $R_7$, $R_8$, $R_9$, $R_{10}$, $R_{11}$, $R_{12}$, $R_{13}$, and $R_{14}$ are the same or different at each occurrence and are hydrogen, isotopes of hydrogen, hydroxyl, alkyl, alkenyl, aryl, alkoxy, cycloalkyl, cycloalkenyl, alkanoyl, alkylthio, aryloxy, alkylthioalkyl, alkynyl, alkylaryl, arylalkyl, amido, alkylsulfinyl, alkoxyalkyl, alkylsulfonyl, arylamino, diarylamino, alkylamino, dialkylamino, phosphoric acid and derivatives thereof, alkylarylamino, arylthio, heterocycle, arylsulfinyl, alkoxycarbonyl, arylsulfonyl, carboxylic acids and derivatives thereof, halo, nitro, cyano, or sulfonic acid and derivatives thereof, or alkyl or phenyl substituted with one or more sulfonic acid and derivatives thereof, phosphoric acid and derivatives thereof, carboxylic acid and derivatives thereof, halo, amino, nitro, cyano, hydroxyl, or epoxy moieties, or a moiety of the formula:

—$(OR_{15})_rOR_{16}$ wherein:

$R_{15}$ is a divalent alkylene moiety having from 1 to about 7 carbon atoms;

$R_{16}$ is alkyl having from 1 to about 20 carbon atoms; and r is an integer from about 1 to 50; or $R_1$ and $R_2$, or $R_3$ and $R_4$, or $R_5$ and $R_6$, or $R_7$ and $R_8$, or $R_9$ and $R_{10}$, or $R_{11}$, and $R_{12}$, or $R_{13}$ and $R_{14}$ substituents taken together are an alkylene, alkynylene or alkenylene group completing a 3, 4, 5, 6, 7, 8, 9, or 10 member aromatic, or saturated or unsaturated cyclic ring, which ring may optionally include one or more heteroatoms of nitrogen, sulfur, phosphorus, selenium, sulfinyl, sulfonyl or oxygen; and $X_1$ and $X_2$ are the same or different and are S, O, Se, $NR_{17}$, or $PR_{17}$, where $R_{17}$ is hydrogen, alkylaryl, arylalkyl, alkyl or aryl.

2. An electrically conductive polymer according to claim 1 wherein the pKa of said acid is less than or equal to about 3 and oxidation potential of said polymer is less than about 4 volts.

3. An electrically conductive polymer according to claim 2 wherein pKa of said acid is less than or equal to about 2 and the oxidation potential of said polymer is less than about 4 volts.

4. An electrically conductive polymer according to claim 3 wherein pKa of said acid is less than or equal to about 1, and the oxidation potential of said polymer is less than about 4 volts vs $Li/Li^+$.

5. An electrically conductive polymer according to claim 1 wherein said conjugated backbone polymer is a homopolymer or copolymer having at least one type of recurring unit of the following formulae I to XIV:

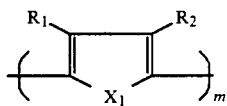 (I)

or

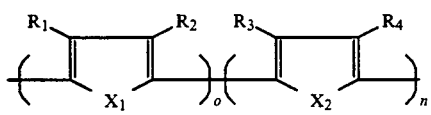 (II)

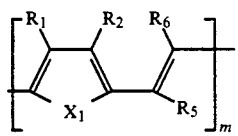 (III)

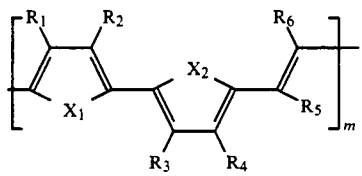 (IV)

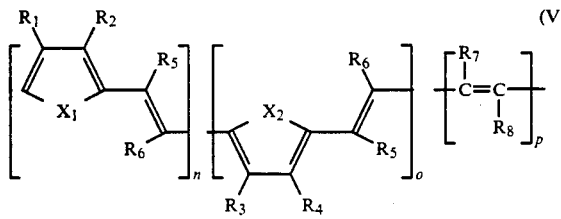 (V)

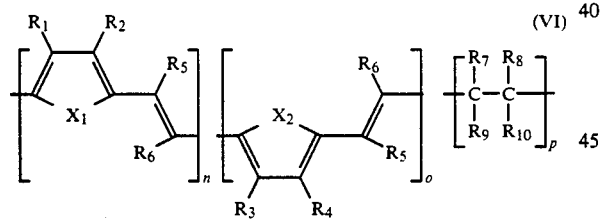 (VI)

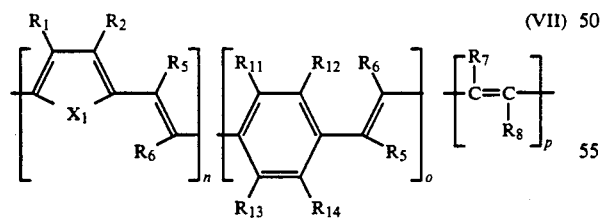 (VII)

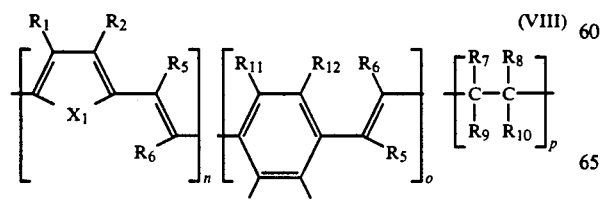 (VIII)

-continued

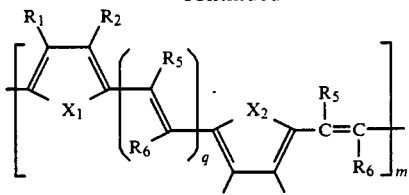 (IX)

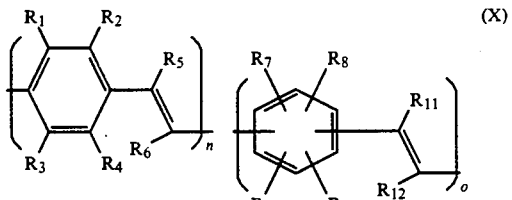 (X)

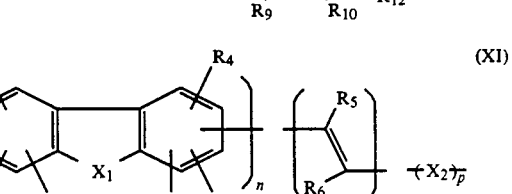 (XI)

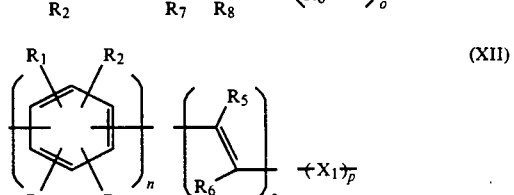 (XII)

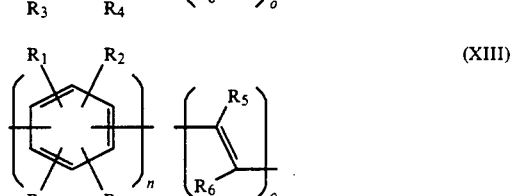 (XIII)

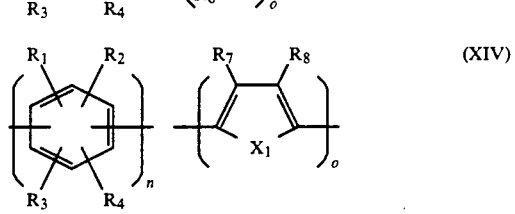 (XIV)

wherein:

m, and the sum of n, o and p, are the same or different and are greater than about 20 with the proviso that at least one of n or o is greater than zero;

q is an integer which can range from 0 to about 4;

$R_1$, $R_2$, $R_3$, $R_4$, $R_5$, $R_6$, $R_7$, $R_8$, $R_9$, $R_{10}$, $R_{11}$, $R_{12}$, $R_{13}$ and $R_{14}$ are the same or different at each occurrence and are hydrogen or isotopes thereof, hydroxyl, alkyl, alkenyl, aryl, alkoxy, cycloalkyl, cycloalkenyl, alkanoyl, alkylthio, aryloxy, alkylthioalkyl, alkynyl, alkylaryl, arylalkyl, amido, alkylsulfinyl, alkoxyalkyl, alkylsulfonyl, arylamino, diarylamino, alkylamino, dialkylamino, phosphoric acid and derivatives thereof, alkylarylamino, arylthio, heterocycle, arylsulfinyl, alkoxycarbonyl, arylsulfonyl, carboxylic acid and derivatives thereof, halogen, nitro, cyano, sulfonic acid and derivatives thereof, or alkyl or phenyl substituted with one or more of sulfonic acid and derivatives thereof, phosphoric acid and derivatives thereof, carboxylic acid and derivatives thereof, halo, amino, nitro, cyano, hydroxyl, or epoxy moieties, or a moiety of the formula:

$$-(OR_{15})_rOR_{16}$$

wherein:
$R_{15}$ is a divalent alkylene moiety having from 1 to about 7 carbon atoms;
$R_{16}$ is alkyl having from 1 to about 20 carbon atoms; and
r is an integer from about 1 to 50; and
$R_1$ and $R_2$, or $R_3$ and $R_4$, or $R_5$ and $R_6$, or $R_7$ and $R_8$, or $R_9$ and $R_{10}$, or $R_{11}$ and $R_{12}$, or $R_{13}$ and $R_{14}$ substituents taken together are an alkylene, alkynylene or alkenylene group completing a 3, 4, 5, 6, 7, 8, 9, or 10 membered aromatic or saturated or unsaturated cyclic carbon rings, which ring may optionally include one or more heteroatoms of nitrogen, sulfur, phosphorus, selenium, sulfinyl, sulfonyl or oxygen; and
$X_1$ and $X_2$ are the same or different and are S, O, Se, $NR_{17}$, or $PR_{17}$, wherein $R_{17}$ is hydrogen, alkylaryl, arylalkyl, alkyl or aryl.

6. An electrically conductive polymer according to claim 1 wherein said doped polymer has an electrical conductivity equal to or greater than about $10^{-2} ohm^{-1} cm^{-1}$.

7. An electrically conductive polymer according to claim 6 wherein said conductivity is equal to or greater than about $10^{-1} ohm^{-1} cm^{-1}$.

8. An electrically conductive polymer according to claim 7 wherein said conductivity is greater than about $10^0 ohm^{-1} cm^{-1}$.

9. An electrically conductive polymer according to claim 8 wherein said conductivity is equal to or greater than about $10^1 ohm^{-1} cm^{-1}$.

10. An electrically conductive polymer according to claim 9 wherein said conductivity is equal to or greater than about $10^2 ohm^{-1} cm^{-1}$.

11. An electrically conductive polymer according to claim 5 wherein:
$R_1$ to $R_{14}$ are the same or different at each occurrence and are hydrogen, hydroxyl, alkoxyalkyl, alkoxy, alkythio, alkyl, phenyl, phenylalkyl, alkanoyl, alkenyl, alkyl or phenyl substituted with one or more cyano, nitro, hydroxyl, epoxy, phosphoric acid and derivatives thereof, carboxylic acid and derivatives thereof, sulfonic acid and derivatives thereof, or halo substituents, or
$$-(OR_{15})_rOR_{16}$$
wherein:
$R_{15}$ is alkylene of about 2 to 3 carbon atoms;
$R_{16}$ is alkyl of from 1 to about 10 carbon atoms; and
r is a natural number from 1 to about 10 or any $R_1$ and $R_2$, or $R_3$ and $R_4$, or $R_5$ and $R_6$, or $R_7$ and $R_8$, or $R_9$ and $R_{10}$, or $R_{11}$ and $R_{12}$, or $R_{13}$ and $R_{14}$ substituents taken together may from an alkylene alkenylene or alkynylene chain having from 2 to about 20 carbon atoms completing 4 to about 10 membered ring systems which may include one or more degrees of unsaturation or one or more heteroatoms of oxygen, sulfur or nitrogen.

12. An electrically conductive polymer according to claim 11 wherein $R_1$ to $R_{14}$ are the same or different at each occurrence and are hydrogen, alkylthio, alkyl, hydroxyl, alkoxy, phenyl, alkoxyalkyl or $$-(OR_{15})_rOR_{16}$$

wherein:
$R_{15}$ is alkylene of about 2 to 3 carbon atoms;
$R_{16}$ is alkyl of from 1 to about 8 carbon atoms; and
r is a natural number from 1 to about 10 or any of $R_1$ and $R_2$, or $R_3$ and $R_4$, or $R_5$ and $R_6$, or $R_7$ and $R_8$, or $R_9$ and $R_{10}$, or $R_{11}$ and $R_{12}$, or $R_{13}$ and $R_{14}$ substituents may form an alkenylene, alkynylene or alkylene chain having 2 to about 20 carbon atoms completing a 4, 5, 6, 7, 8, 9 or 10 membered ring system which may include one or more degrees of unsaturation or one or more heteroatoms of nitrogen, oxygen or sulfur.

13. An electrically conductive polymer according o claim 12 wherein $R_1$ to $R_{14}$ are the same or different and each occurrence are hydrogen, hydroxyl, alkyl, alkoxy or alkoxyalkyl or $$-(OR_{15})_rOR_{16}$$

wherein:
$R_{15}$ is alkylene of about 2 to 3 carbon atoms;
$R_{16}$ is alkyl of from 1 to about 3 carbon atoms; and
r is a natural number from 1 to about 10 or any of $R_1$ and $R_2$, or $R_3$ and $R_4$, or $R_5$ and $R_6$, or $R_7$ and $R_8$, or $R_9$ and $R_{10}$, or $R_{11}$ and $R_{12}$, or $R_{13}$ and $R_{14}$ together may form an alkylene or alkenylene chain forming an alicyclic, aromatic or heteroaromatic ring.

14. An electrically conductive polymer according to claim 13 wherein:
$R_1$ to $R_{14}$ are the same or different and are hydrogen, alkoxy or alkyl having 1 to about 12 carbon atoms, alkoxyalkyl having from 2 to about 12 carbon atoms or a moiety of the formula:

$$-(OR_{14})_rOR_{16}$$

wherein:
$R_{15}$ is $-(CH_2)_2-$ or $-CH_2CH(CH_3)-$;
$R_{16}$ is $-CH_3$ or $-CH_2CH_3$; and
r is a natural number from 1 to about 6.

15. An electrically conductive polymer according to claim 14 wherein $R_1$ to $R_{14}$ are hydrogen, alkyl or alkoxy.

16. An electrically conductive polymer according to claim 15 wherein $R_1$ to $R_{14}$ are the same or different at each occurrence and are hydrogen or alkyl having from 1 to about 12 carbon atoms.

17. An electrically conductive polymer according to claim 16 wherein $R_1$ to $R_{14}$ are hydrogen.

18. An electrically conductive polymer of claim 5 wherein $X_1$ or $X_2$ is $NR_{17}$, S or O.

19. An electrically conductive polymer according to claim 18 wherein X1 and $X_2$ are $NR_{17}$, wherein $R_{17}$ is hydrogen or alkyl of from about 1 to about 12 carbon atoms, phenyl or alkylphenyl of from about 6 to about 12 carbon atoms 20. An electrically conductive polymer according to claim 19 wherein R 7 is hydrogen or alkyl.

21. An electrically conductive polymer according to claim 5 wherein m, and the sum of n, o and p are the same or different and are at least about 25.

22. An electrically conductive polymer according to claim 21 wherein m, and the sum of n, o and p are the same or different and are at least about 50.

23. An electrically conductive polymer according to claim 22 wherein m, and the sum of n, o and p are the same or different and are at least about 100.

24. An electrically conductive polymer according to claim 23 wherein m, and n, o and p are the same or different and are equal to or greater than about 125.

25. An electrically conductive polymer according to claim 24 wherein m, and the sum of n, o and p are the same or different and are equal to or greater than about 150.

26. A polymer solution comprising
(a) a solvent selected from the group consisting of organic solvents; and
(b) one or more electrically conductive polymers according to claim 1.

27. An electrically conductive polymer according to claim 1 having at least one type or recurring unit of the Formula VII or VIII wherein:
n, o and p are the same or different at each occurrence and are O, or an integer equal to or greater than 1, with the proviso that the sum of n, o and p is equal to or greater than about 25;
$R_1$, $R_2$, $R_3$, $R_4$, $R_5$, $R_6$, $R_7$, $R_8$, $R_9$, $R_{10}$, $R_{11}$, $R_{12}$, $R_{13}$ and $R_{14}$ are the same or different and are alkyl, alkoxy or hydrogen.

28. An electrically conductive polymer according to claim 3 wherein the sum of n, o and p is at least about 50.

29. An electrically conductive polymer according to claim 27 wherein:
$R_1$, $R_2$, $R_3$, $R_4$, $R_5$, $R_6$, $R_7$, $R_6$, $R_8$, $R_9$, $R_{11}$, $R_{12}$, $R_{13}$ and $R_{14}$ are the same or different and are hydrogen, or alkyl or alkoxy having from 1 to about 12 carbon atoms; and
$X_1$ is S, O or NH.

30. An electrically conductive polymer according to claim 29 wherein:
$R_1$, $R_2$, $R_{11}$, $R_{12}$, $R_{13}$ and $R_{14}$ are the same or different and are hydrogen, alkyl or alkoxy; and
$R_5$, $R_6$, $R_7$, $R_8$, $R_9$ and $R_{16}$ are the same or different and are hydrogen or alkyl.

31. An electrically conductive polymer according to claim 30 wherein:
$R_1$, $R_2$, $R_{11}$, $R_{12}$, $R_{13}$, and $R_{14}$ are the same or different at each occurrence and are hydrogen of alkoxy; and
$R_5$, $R_6$, $R_7$, $R_8$, $R_9$, and $R_{10}$ are hydrogen.

32. An electrically conductive polymer according to claim 30 wherein o and p are zero;

33. An electrically conductive polymer according to claim 30 wherein n and p are zero.

34. An electrically conductive polymer according to claim 31 selected from the group consisting of poly(1,4-phenylene vinylene), poly(2,5-dimethoxy-1,4-phenylene vinylene), and poly(2,5-dibutoxy-4-phenylene vinylene).

35. An electrically conductive polymer according to claim 34 wherein said polymer is poly (2,5-dibutoxy-4-phenylene vinylene).

36. An electrically conductive polymer according to claim 31, selected from the group consisting of poly(2,5-thienylene vinylene), poly(3-methoxy-2,5-thienylene vinylene), poly(3,4-dimethoxy-2,5-thienylene vinylene) and poly(3,4-dibutoxy-2,5-thienylene vinylene).

37. An electrically conductive polymer according to claim 23 having at least one type of recurring unit of the Formula VII or VIII wherein:
n, o and p are the same or different at each occurrence and are O, or an integer equal to or greater than 1, with the proviso that the sum of n, o and p is equal to or greater than about 25; and
$R_1$, $R_2$, $R_3$, $R_4$, $R_5$, $R_6$, $R_7$, $R_8$, $R_9$, $R_{10}$, $R_{11}$, $R_{12}$, $R_{13}$ and $R_{14}$ are the same or different and are alkyl, alkoxy or hydrogen.

38. An electrically conductive polymer according to claim 37 wherein the sum of n, o and p is at least about 50.

39. An electrically conductive polymer according to claim 37 wherein:
$R_1$, $R_2$, $R_3$, $R_4$, $R_5$, $R_6$, $R_7$, $R_8$, $R_9$, $R_{10}$, $R_{11}$, $R_{12}$, $R_{13}$ and $R_{14}$ are the same or different and are hydrogen, or alkyl or alkoxy having from 1 to about 12 carbon atoms; and
$X_1$ is S, O or NH.

40. An electrically conductive polymer according to claim 39 wherein $R_1$, $R_2$, $R_{11}$, $R_{12}$, $R_{13}$ and $R_{14}$ are the same or different and are hydrogen, alkyl or alkoxy; and
$R_5$, $R_6$, $R_7$, $R_8$, $R_9$ and $R_{16}$ are the same or different and are hydrogen or alkyl.

41. An electrically conductive polymer according to claim 30 wherein:
$R_1$, $R_2$, $R_{11}$, $R_{12}$, $R_{13}$, and $R_{14}$ are the same or different at each occurrence and are hydrogen or alkoxy; and
$R_5$, $R_6$, $R_7$, $R_8$, $R_{10}$ are hydrogen.

42. An electrically conductive polymer according to claim 30 wherein o and p are 0.

43. An electrically conductive polymer according to claim 30 wherein n and p are 0.

44. An electrically conductive polymer according to claim 31 where said polymer is selected from the group consisting of poly(1,4-phenylene vinylene), poly(2,5-dimethoxy-1,4-phenylene vinylene) and poly(2,5-dibutoxy-1,4-phenylene vinylene).

45. An electrically conductive polymer according to claim 44 wherein said polymer is poly(2,5-dibutoxy-1,4-phenylene vinylene).

46. An electrically conductive polymer according to claim 30 selected form the group consisting of poly(2,5-thienylene vinylene), poly(3-methoxy-2,5-thienylene vinylene), poly (3,4-dimethoxy-2,5-thienylene vinylene) and poly (3,4-dibutoxy-2,5-thienylene vinylene).

* * * * *